United States Patent
Collard

(10) Patent No.: US 9,659,168 B2
(45) Date of Patent: May 23, 2017

(54) SOFTWARE IDENTIFICATION

(71) Applicant: NXP B.V., Eindhoven (NL)

(72) Inventor: Arnaud Collard, Montesson (FR)

(73) Assignee: NXP B.V., Eindhoven (NL)

( * ) Notice: Subject to any disclaimer, the term of this patent is extended or adjusted under 35 U.S.C. 154(b) by 131 days.

(21) Appl. No.: 14/064,037

(22) Filed: Oct. 25, 2013

(65) Prior Publication Data

US 2014/0143865 A1    May 22, 2014

(30) Foreign Application Priority Data

Nov. 22, 2012   (EP) .................................... 12290408

(51) Int. Cl.
*G06F 21/52*   (2013.01)
*G06F 21/64*   (2013.01)

(52) U.S. Cl.
CPC .............. *G06F 21/52* (2013.01); *G06F 21/64* (2013.01)

(58) Field of Classification Search
CPC ................................. G06F 21/52; G06F 21/64
USPC ......................................................... 726/22
See application file for complete search history.

(56) References Cited

U.S. PATENT DOCUMENTS

| | | | | |
|---|---|---|---|---|
| 5,274,817 A | * | 12/1993 | Stahl | ..................... G06F 9/3806 712/233 |
| 5,758,051 A | * | 5/1998 | Moreno | ................. G06F 9/3863 712/E9.048 |
| 6,006,328 A | * | 12/1999 | Drake | ............................. 726/23 |
| 6,463,535 B1 | * | 10/2002 | Drews | ................... G06F 9/4416 713/176 |
| 6,681,329 B1 | * | 1/2004 | Fetkovich | ............... G06F 21/52 713/162 |
| 6,738,932 B1 | * | 5/2004 | Price | ..................... G06F 11/079 714/38.11 |
| 6,760,441 B1 | * | 7/2004 | Ellison | .................... G06F 21/53 380/44 |
| 6,795,910 B1 | * | 9/2004 | Tormey | ............... G06F 11/0724 711/E12.101 |
| 7,581,089 B1 | * | 8/2009 | White | ................... G06F 9/4426 712/242 |
| 2003/0126590 A1 | * | 7/2003 | Burrows et al. | ............. 717/154 |
| 2003/0191940 A1 | * | 10/2003 | Sinha | ...................... G06F 21/64 713/176 |
| 2004/0103252 A1 | * | 5/2004 | Lee | ..................... G06F 12/1441 711/132 |
| 2004/0143739 A1 | | 7/2004 | de Jong | |
| 2005/0228989 A1 | * | 10/2005 | Rabin et al. | .................. 713/161 |
| 2006/0143527 A1 | * | 6/2006 | Grey et al. | ...................... 714/33 |
| 2006/0161739 A1 | * | 7/2006 | Genty | ................. G06F 12/1466 711/152 |

(Continued)

OTHER PUBLICATIONS

Rivest, R. "Network Working Group, Request for Comments 1321, the MD5 Message Digest Algoritm", 21 pgs. (Apr. 1992).

(Continued)

*Primary Examiner* — Harunur Rashid
(74) *Attorney, Agent, or Firm* — Rajeev Madnawat

(57) ABSTRACT

A method of generating identification data for identifying software is disclosed. The method includes executing said software so as to alter one or more addresses of a memory stack reserved in memory for execution of the software. Identification data is then generated for identifying the software based on the one or more altered addresses of the memory stack.

11 Claims, 7 Drawing Sheets

(56) References Cited

U.S. PATENT DOCUMENTS

| | | | |
|---|---|---|---|
| 2006/0288342 A1* | 12/2006 | Hatlelid et al. .............. 717/168 |
| 2007/0162520 A1* | 7/2007 | Petersen ............... G06F 11/141 |
| 2012/0131673 A1* | 5/2012 | Caci ....................... G06F 21/86 |
| | | | 726/23 |
| 2013/0247181 A1* | 9/2013 | Saraf .................... G06F 21/566 |
| | | | 726/22 |
| 2013/0262936 A1* | 10/2013 | Elliott ................ G06F 11/0715 |
| | | | 714/45 |

OTHER PUBLICATIONS

NIST "FIPS Pubs 197, Announcing the Advanced Encryption Standard (AES)", 51 pgs. (Nov. 26, 2001).
Microsoft Corporation, "Robustness Rules for Playready Finale Products", 9 pgs. (Apr. 28, 2010).
Extended European Search Report for EP Patent Appln. No. 12290408.9 (Jun. 3, 2013).

* cited by examiner

| | |
|---|---|
| 0x014500000 | 11 |
| 0x1 | 10 |
| 0x14 | 9 |
| 0x0 | 8 |
| 0xffffffff | 7 |
| 0x154 | 6 |
| 0x80007500 | 5 |
| 0xAAAAAAAA | 4 |
| 0xAAAAAAAA | 3 |
| 0xAAAAAAAA | 2 |
| 0xAAAAAAAA | 1 |
| 0xAAAAAAAA | 0 |

FIG. 3

| | |
|---|---|
| 0x014500000 | 11 |
| 0x1 | 10 |
| 0x14 | 9 |
| 0x0 | 8 |
| 0xffffffff | 7 |
| 0x154 | 6 |
| 0x80007500 | 5 |
| 0x89 | 4 |
| 0xAAAAAAAA | 3 |
| 0x0 | 2 |
| 0x1 | 1 |
| 0xAAAAAAAA | 0 |

FIG. 4

| | |
|---|---|
| 0x014500000 | 11 |
| 0x1 | 10 |
| 0x14 | 9 |
| 0x0 | 8 |
| 0xffffffff | 7 |
| 0x154 | 6 |
| 0x80007500 | 5 |
| 0x0 | 4 |
| 0xAAAAAAAA | 3 |
| 0x0 | 2 |
| 0x0 | 1 |
| 0xAAAAAAAA | 0 |

FIG. 5

SOFTWARE IDENTIFICATION

CROSS-REFERENCE TO RELATED APPLICATIONS

This application claims the priority under 35 U.S.C. §119 of European patent application no. 12290408.9, filed on Nov. 22, 2012, the contents of which are incorporated by reference herein.

FIELD OF THE INVENTION

This invention relates to the field of computer software, and more particularly to identifying software.

BACKGROUND

For many reasons, including virus detection, rights protection and security, it can be desirable to be able to identify software. Such software should be broadly construed to include (but not limited to) any digital content such as computer code, Java applets, digitized media (including music, images or audio), or digitized text and data.

Numerous concepts of software identification are known, many of which rely on obtaining a unique identification value (such as a fingerprint) of a given piece of software. A common method for obtaining a fingerprint of a software program is to perform a MD5 checksum on the compiled software code. This, however, exhibits security weaknesses. It can also be difficult to implement when the software code itself is hard to execute.

Also, it is common for software programs to make security related operations during execution. Thus, in such programs, there is a need for security-related provisions such as encryption, tamper resistance and software-environment recognition.

Encryption is commonly employed for storing critical data. For example, critical data is commonly encrypted using a key. The key therefore needs to be secure because once it is known it is easy to decrypt the critical data. Creation of a secure key and/or its safe storage presents many problems.

Tamper resistance is typically employed prevent the executed software from being modified by a hacker in order to divert the primary usage of the program. This is provided by performing checks on the software, using a MD5 checksum for example.

Recognition of the software environment helps to ensure that software runs in a trusted environment. To do this, a software program may check that the environment is known and not tampered with. For instance, a software program may determine the version of the operating system and determine that the version is out-of-date or does not meet predetermined security requirements. As with the use of checksums, it can also be easy to reverse engineer such environment checks.

BRIEF SUMMARY OF THE INVENTION

According to an aspect of the invention there is provided a method of generating identification data for identifying software according to independent claim 1.

Embodiments may generate identification data (such as a fingerprint or a signature) for uniquely identifying software based on its execution. The identification data may thus be used for security-related processes for software running on any computing device, such as but not limited to the authentication of part of a computer program or the generation of a key used to encrypt/decrypt data.

Embodiments may employ dynamic/runtime generation of the identification data which means the software must be executed in order to generate the identification data. This may prevent the identification data from being discovered by static analysis of the software.

Inherent properties of a memory stack may be employed. This may make the identification data more difficult to understand by a hacker. Also, since software uses a memory stack, embodiments may be applicable to all software and require little additional logic.

By generating the identification data based on what has been really executed on a device, embodiments may provide an improved level of trust.

According to another aspect of the invention, there is provided a method of generating an encryption key according to claim 9.

According to yet another aspect of the invention, there is provided a method of encrypting data according to claim 10.

BRIEF DESCRIPTION OF THE DRAWINGS

Preferred embodiments of the present invention will now be described, by way of example only, with reference to the following drawings in which:

FIG. 3 illustrates an example of how the memory stack of FIG. 1 may look after pre-processing according to an embodiment;

FIG. 4 illustrates an example of how the memory stack of FIG. 3 may look software execution according to an embodiment;

FIG. 5 illustrates an example of how the memory stack of FIG. 4 may look after post-processing according to an embodiment;

DETAILED DESCRIPTION OF THE EMBODIMENTS

Electronic devices, such as computers, smartphones, set-top boxes, etc., employ a computation unit (or processor) adapted to execute software programs with the help of an Operating System (OS) such as Linux, Windows, Android, iOS, etc. Execution of the software is assisted by a software component commonly referred to as the memory stack. The memory stack is a space reserved in memory for executed software code to manipulate data and/or variables. Such manipulation of data and/or variable is used, for example, to manipulate a large number of local variables used in a specific function, or to communicate parameters (that cannot fit directly in hardware registers, for example) to a child function.

Typically, there is a dedicated stack for each thread running in a computing system, and so no other thread will use the stack of another process. In other words, all data present in a stack is owned by a given thread.

Figure 1:
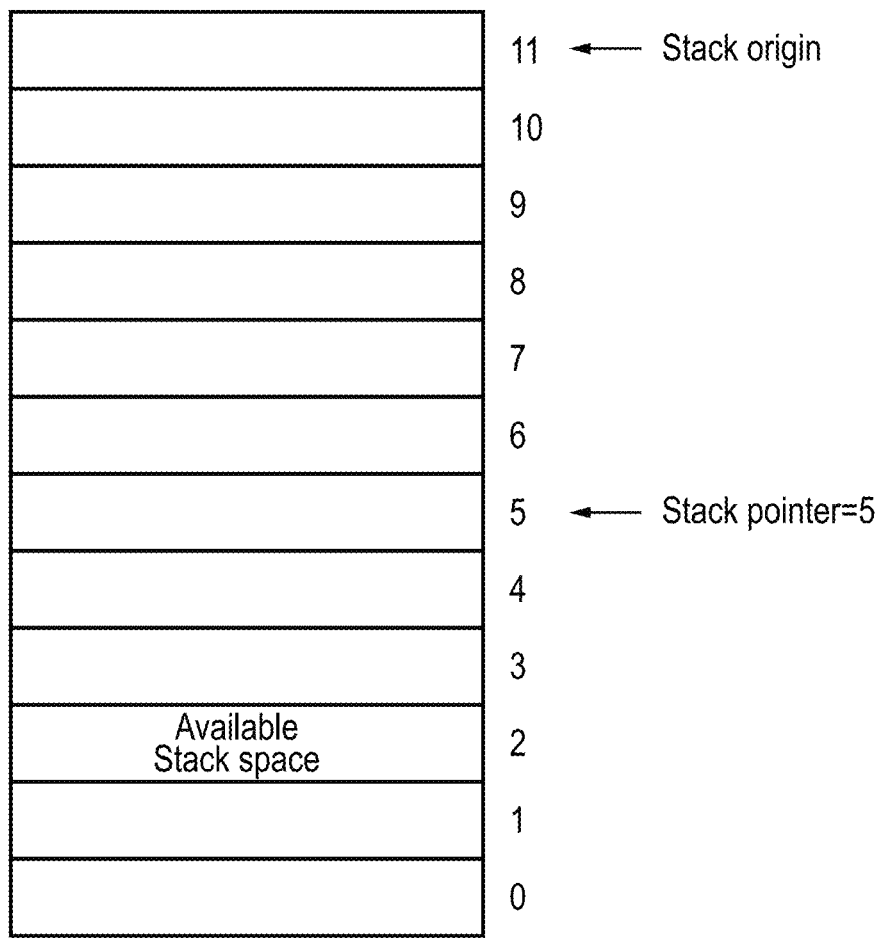
FIG. 1 is a representation of an exemplary memory stack.

FIG. 1 is a representation of an exemplary memory stack. A memory stack is typically a data queue running in LIFO (Last In First Out) mode, and is usually used with a stack pointer in reverse addressing mode (e.g. when new data is added, the stack pointer points to a new free space with a lower data address).

In the example of FIG. 1, the stack origin is at address 11 and the stack pointer is at address 5 during execution of a function N (which has stored all local data related to function N in the space [5 . . . 11]). When a new function N+1 is called (during function N), local data related to the new function N+1 is put in the space [4 . . . 0]. In this way, data of function N is not overwritten by a new function N+1. Also when returning in function N, the stack pointer is reverted back to address 5, and so some data will remain in space [0 . . . 4] but will not be used anymore.

Embodiments use a memory stack as an input for computing identification data for software which has been previously executed and used the memory stack.

Such identification data may be used as an identifier of the software, or as a key for encrypting/decrypting other critical data, such as private user data or sensitive algorithms.

Before execution of the software, pre-processing of the available space in the memory stack may be undertaken to make sure that that generation of the identification data is possible. Then, once the software has been executed, post processing may be completed on the part of stack which has been used by the software. The result of this processing creates a unique fingerprint of the software from traces of execution left in the stack.

Further, pre-processing and post-processing helps to ensure that fingerprint will be constant in the case that inputs of the executed software are invariant from one run to another on the same device.

Figure 2:
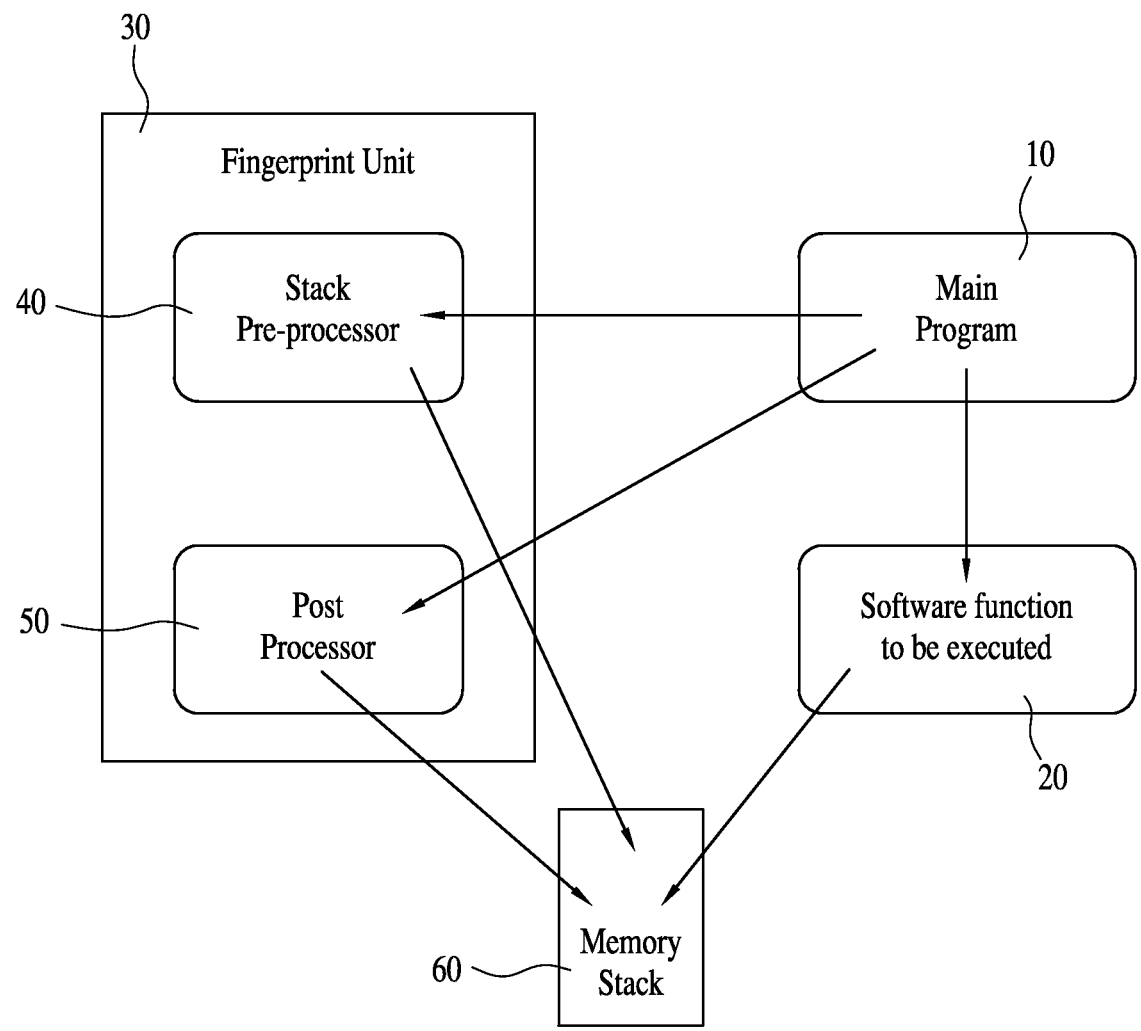
FIG. 2 is a schematic block diagram of the software components (and their interaction) of an embodiment of the invention.

Turning now to FIG. 2, there is shown a schematic block diagram of the software components (and their interaction) of an embodiment of the invention.

A method employed by an embodiment to generate identification data for identifying software may be decomposed into the following three main steps: pre-processing of the memory stack, execution of the software, and post-processing of the memory stack.

In first step, the main program 10 calls a stack pre-process 40 which is part of the Fingerprint Unit 30. The stack pre-processor 40 then initialises a predetermined amount of available space in the memory stack 60 with predefined values. This is undertaken to place the memory stack in a known state, since other software programs may have been previously executed and filled the available space of the memory stack with their own internal values. In other words, the memory stack is pre-processed so as to be arranged in a known predetermined condition or state.

By way of example, FIG. 3 illustrates what the memory stack of FIG. 1 looks like after pre-processing according to an embodiment. Here, the used space [4 . . . 0] is filled with 32 bit example data having the chosen value of "0xaaaaaaaa"

In the second step, the main program 10 calls the software/function to be executed 20, this is then executed and fills the available (and pre-processed) section [4 . . . 0] memory stack 60. FIG. 4 illustrates an example of how the memory stack of FIG. 3 looks after this software execution step. Here, addresses 1,2 and 4 have been filled with data 0x1, 0x0 and 0x89, respectively.

Resulting from the way a memory stack 60 is used to execute software, it is likely that the memory stack is not fully used after the software execution step. Indeed, as shown in FIG. 4, some parts of the stack remain with the pre-processed pattern. This comes from the fact that, according to program flow, not all local variables which have been assigned to the memory stack 60 will be used. Also, some tables locally defined in functions are partially used, like local string tables.

By way of example, below is an exemplary C function that will generate a waste of at least 12 bytes in the stack:

```
int aFunction(char* firstString)
{
    static char secondString[17]="ABCD";
    strcpy(firstString , secondString);
    return TRUE;
}
```

In this case, the compiler will typically reserve 17 bytes in the stack for the local string (16 characters+NULL termination), initialize the four first bytes with "ABCD" and put NULL character in byte 17. So from byte 5 to 16, memory will be kept unchanged.

It is also possible that from one run to another, even if all the inputs of a given piece of software are the same, the content of the memory stack will be different. This is due to two factor: (i) programs may use dynamic allocation memory which will not give the same memory addresses from one run to another; and (ii) programs can push function addresses in the memory stack and these addresses can be different from one run to another (because of address space layout randomization, for example, which is used to randomize function addresses for security purposes).

In the third and final step, the stack post-processor 50 is called by the main program 10 and replaces all values in the memory stack which are not equal to the predefined value with a second (different) predefined value. The result of this post-processing step is a sequence in the memory stack of the two different pre-defined values. For example, FIG. 5 illustrates an example of the memory stack of FIG. 4 looks after such a post-processing step wherein the second pre-defined value is "0x0"). Here, addresses 1, 2 and 4 have each been filled with data "0x0".

To use the result of this process to define identification data (such as a fingerprint) for the software, it is preferable that the output remains the same between executions of the same software 20. This can be realized by imposing the following conditions:

(i) Run the software in a system where the memory stack 60 is not shared with other external pieces of software executed on the system. For instance, operating systems threads should be prevented from using the memory stack 60 if the OS interrupts software execution. Also, external hardware or software interrupts should not run any software using the memory stack 60, and any other applications running concurrently should not use the memory stack 60.

(ii) Keep the inputs of the executed software exactly the same. Here, "inputs" should be construed broadly to not only refer to the parameters of the software function(s) called for execution on the memory stack 60, but also any input coming from the system required by any function of the executing software, such as a clock request. It may also refer to external conditions that can change the execution flow, such as HTTP transfers with network troubles. Thus, it is preferable to insulate the executed software from the external environment.

(iii) The software should not include any conditional branches which depend on address changes.

(iv) Avoid software caching mechanisms that imply change of location of used data between executions. This does not include hardware cache mechanisms in processors which are completely transparent to the software.

(v) Data generated by the software in the memory stack should not match the predefined value(s) used in the pre-processing step. By way of example, such matching can be avoided by adapting the size of the pre-defined value/pattern (like 64 bit instead of 32 bit) as it will reduce the potential occurrence of matching. Also, in some embodiments, the predefined value/pattern may be chosen to match an address space which is not used by the software (because not authorized for instance), to avoid false positive matching.

Figure 6:
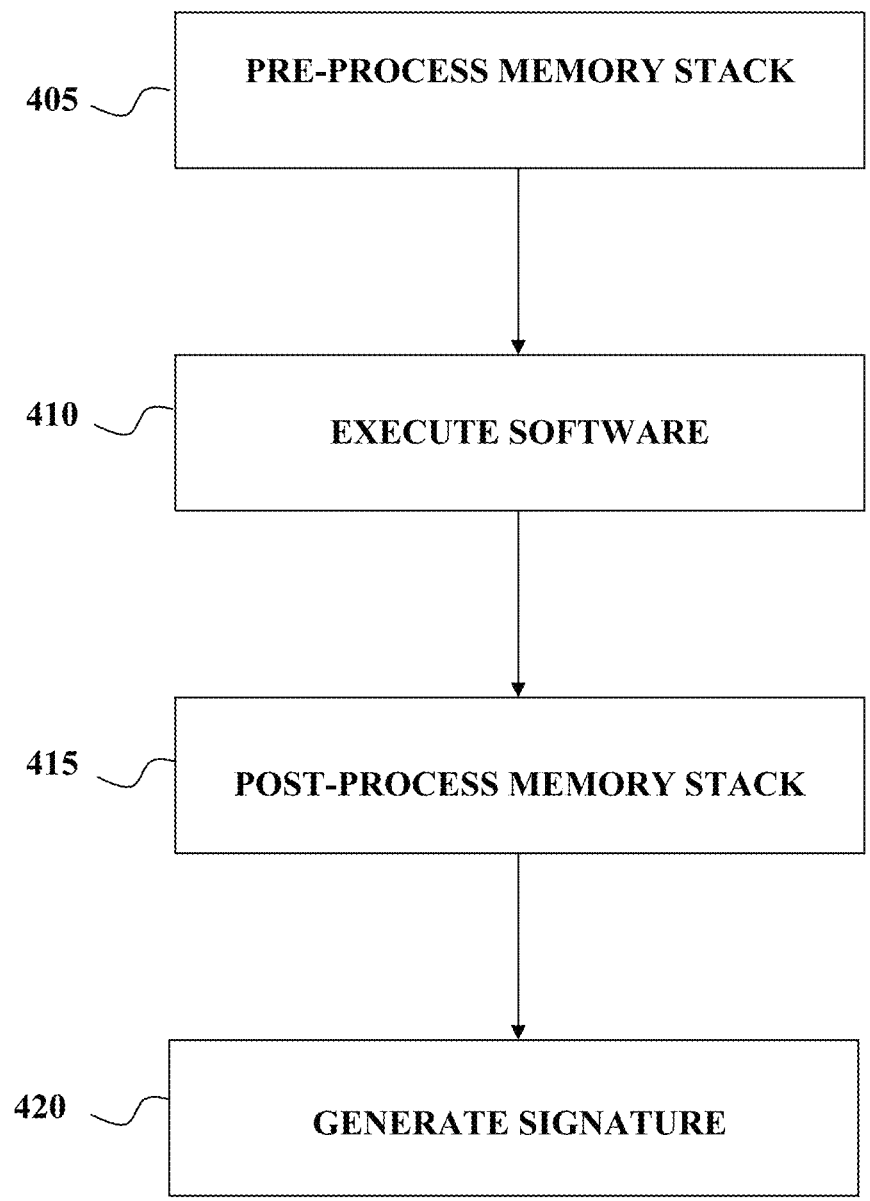
FIG. 6 is a flow diagram of a method according to an embodiment of the invention.

Turing now to FIG. 6, there is shown a flow diagram of a method of generating a signature for uniquely identifying software. The method begins with step 405 in which an available portion of a memory stack is pre-processed so as to set the available space to a known state. Here, each address of the available portion is initialised to a first predetermined value. In this way, the available portion of the memory stack is filled with known data.

Next, in step 410, the software for which the memory stack is allocated is executed thus altering the available portion of the memory stack. In this way, the executed software changes the data of at least one address of the available portion in the memory stack.

The memory stack is then post-processed in step 415 to replace all of the data changed by the executed software. In other words, the values in the available portion of the memory stack which are no longer equal to the first predetermined value are set of a second (different) predetermined value. This results in the available portion of the memory stack storing a pattern of first and second predetermined values, wherein the pattern has been defined by the software execution. Put another way, the pattern of first and second predetermined values in portion of the memory stack results from the software execution and may be viewed as an execution trace left in the stack which may uniquely identify the software.

From the pattern of first and second predetermined values in the portion of the memory stack, a fingerprint of the software is generated in the final step 420. Here, the fingerprint may comprise information representing the addresses of the portion of the memory stack that contain the first or second predetermined value. This information may simply be recited as the appropriate addresses in normal form, or may be encoded using a known algorithm so as to add a layer of abstraction or security.

Figure 7:
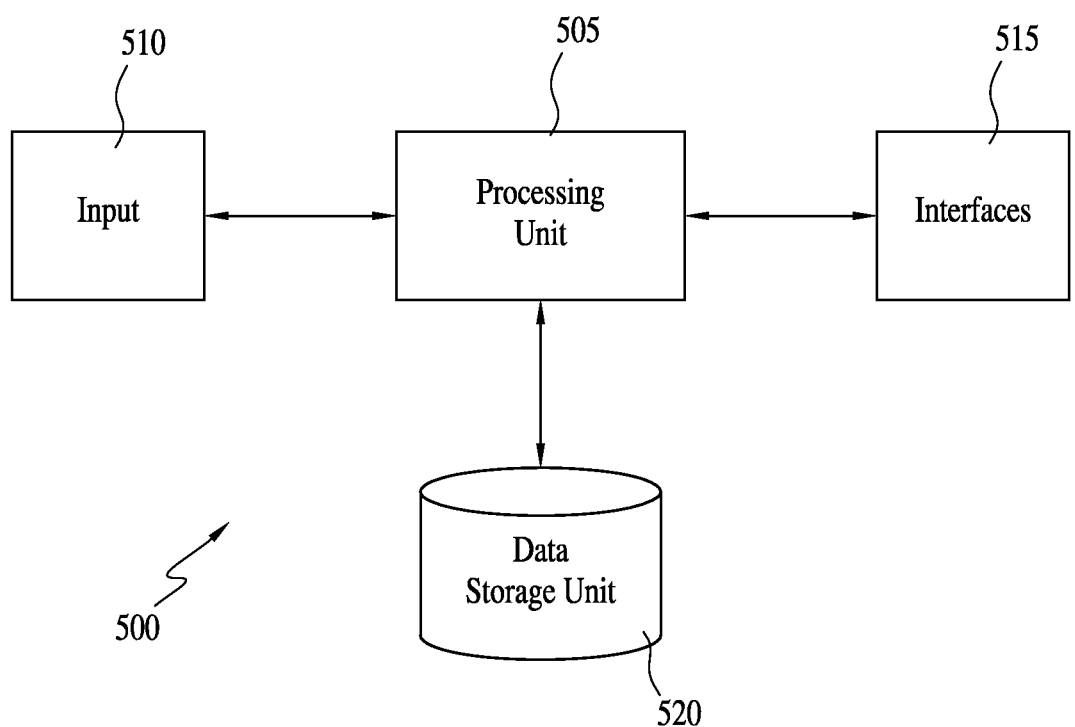
FIG. 7 is a schematic block diagram of a computer system according to an embodiment of the invention.

Referring now to FIG. 7, there is illustrated a schematic block diagram of a computer system 500 according to an embodiment. The computer system 500 is adapted to generate identification data for uniquely identifying software by executing the software. The system comprises a processing unit 505 having input 510 and output 515 interfaces, and a data storage unit 520 connected to the processing unit 305.

The input interface 510 is adapted to receive inputs and/or instructions from a user, and the output interface 515 is adapted to provide identification data from the processing unit 505 to a user and/or a computing device.

The data storage unit 520 is adapted to store one or more memory stacks for enabling software execution. In other words, the data storage unit 520 is adapted to provide one or more memory stacks that can be used by the processor to execute software received from the input interface 510.

The processing unit 505 is adapted to execute a computer program which, when executed, causes the system to implement the steps of a method according to an embodiment, for example the steps as shown in FIG. 6.

The processing unit 505 is adapted to receive, via the input interface 510, software accompanied by user input information. Based on the user input information and the software, the processing unit 505 generates identification data for identifying the software. More specifically, the processing unit 505 executes the software using an available memory stack of the data storage unit 520 so as to alter one or more addresses of a memory stack. Based on the one or more altered addresses of the memory stack, the processing unit 505 then generates identification data for identifying the software and provides the identification data control to the user and/or a computing device via the output interlace 515. Thus, the processor 505 is adapted to generate identification data for identifying the software based on results of executing the software in conjunction with a reserved memory stack.

Embodiments may be captured in a computer program product for execution on the processor of a computer, e.g. a personal computer or a network server, where the computer program product, if executed on the computer, causes the computer to implement the steps of a method according to an embodiment, e.g. the steps as shown in FIG. 6. Since implementation of these steps into a computer program product requires routine skill only for a skilled person, such an implementation will not be discussed in further detail for reasons of brevity only.

In an embodiment, the computer program product is stored on a non-transitory computer-readable medium. Any suitable computer-readable medium, e.g. a CD-ROM, DVD, USB stick, memory card, network-area storage device, internet-accessible data repository, and so on, may be considered.

Exemplary embodiments of the invention may have the following applications:

Key generation using JPEG decoding

Embodiments can employ JPEG decompression, which is not related at all to passwords storage, as the input software for a fingerprint. Then, after applying MD5, a 128-bit key can be provided which can be used to encrypt/decrypt the passwords using AES-128 bit algorithm.

Recognition of an operating system

Embodiments can be employed at an initialization time to test a system by calling a given number of system functions with some test vectors with the only purpose of generating fingerprints. The fingerprint(s) will represent a signature of a unique version of the operating system on the device. If the signature is not recognized as a valid one (e.g. a trusted signature can be stored locally or even on a deported server), then one can decide to stop running considering that the system is not safe (for stability and/or security purposes)

Authentication

Embodiments may be employed where software security and Dynamic Right Management service are used, such as: Paid-for TV applications; Paid applications in general which require authentication (like games, for example); applications which require to obfuscate some critical data;

Embodiments can be used on connected devices (such as TVs, set-top boxes, smartphones, tablets, etc. . . . ), or unconnected devices (like car). Thus, a computer system according to an embodiment may comprise any suitably arranged computing device having a microprocessor adapted to implement a method according to an embodiment. Such a computing device may be a mobile phone, a TV, a set-top box, a tablet computer, a personal computer, a car, etc.

Various modifications will be apparent to those skilled in the art.

For example, the size of the memory stack that will be treated may be of several KBytes, so it could be convenient to apply an MD5 on this to get a more compressed and normalized output (like to 128 bit value).

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of generating identification data for identifying software comprising:
   pre-processing a memory stack by setting the memory stack to a first predetermined state, the first predetermined state including multiple addresses being initialized to a first predetermined value;
   altering one or more addresses of the memory stack by executing the software;
   post-processing the memory stack so as to set portions of the memory stack to a second predetermined state, wherein the one or more addresses altered by the executed software are set to a second predetermined value;
   generating the identification data based on the one or more altered addresses of the memory stack, wherein the identification data uniquely identifies the software based upon a pattern of the first predetermined value and the second predetermined value in the memory stack;
   generating a fingerprint from the pattern, wherein the fingerprint comprises information representing addresses of a portion of the memory stack containing the first predetermined value and the second predetermined value;
   generating an encryption key using the generated identification data;
   encrypting data using the generated encryption key in accordance with an encryption process;
   generating a decryption key using the generated identification data; and
   decrypting data using the generated decryption key in accordance with the encryption process.

2. The method of claim 1, wherein the pre-processing comprises:
   initializing each address of the memory stack with the first predetermined value.

3. The method of claim 2, wherein a bit-format of a predetermined value does not match a bit-format of values used by the software when executed.

4. The method of claim 1, further comprising:
   after executing said software and prior to generating the identification data, post-processing the portions of the memory stack so as to set the memory stack to the second predetermined state.

5. The method of claim 1, further comprising:
   preventing the memory stack from being used by any other software.

6. The method of claim 1, wherein the identification data is a signature for uniquely identifying the executed software.

7. The method of claim 1, further comprising:
   executing said software so as to alter one or more addresses of a memory stack reserved in memory for execution of the software;
   comparing the one or more altered addresses of the memory stack with the generated identification data; and
   identifying the software based on the comparing step.

8. The method of claim 1, wherein the software is an operating system.

9. The method of claim 8, wherein the identification data identifies a unique version of the operating system.

10. A computer system configured to identify software, the system comprising:
    a data storage unit; and
    a processing unit configured to pre-process a memory stack in the data storage unit, by setting the memory stack to a first predetermined state, the first predetermined state including multiple addresses being initialized to a first predetermined value, alter one or more addresses of the memory stack by executing the software, post-process the memory stack so as to set portions of the memory stack to a second predetermined state, wherein the one or more addresses altered by the executed software are set to a second predetermined value, generate the identification data based on the one or more altered addresses of the memory stack, wherein the identification data uniquely identifies the software based upon a pattern of the first predetermined value and the second predetermined value in the memory stack, generate a fingerprint from the pattern, wherein the fingerprint comprises information representing addresses of a portion of the memory stack containing the first predetermined value and the second predetermined value, generate an encryption key using the generated identification data, encrypt data using the generated encryption key in accordance with an encryption process, generate a decryption key using the generated identification data, and decrypt data using the generated decryption key in accordance with the encryption process.

11. A method of generating identification data for identifying software comprising:
    pre-processing a memory stack by setting the memory stack to a first predetermined state by initializing addresses of the memory stack each with a first predetermined value;
    altering one or more addresses of the memory stack by executing the software;
    post-processing the memory stack by setting each of the one or more altered addresses of the memory stack to a second predetermined value;
    generating the identification data based on the altered addresses of the memory stack, wherein the identification data uniquely identifies the software based upon a pattern of the first predetermined value and the second predetermined value in the memory stack;
    generating a fingerprint from the pattern, wherein the fingerprint comprises information representing addresses of a portion of the memory stack containing the first predetermined value and the second predetermined value;

generating an encryption key using the generated identification data;
encrypting data using the generated encryption key in accordance with an encryption process;
generating a decryption key using the generated identification data; and
decrypting data using the generated decryption key in accordance with the encryption process.

\* \* \* \* \*